United States Patent [19]

Camacho

[11] Patent Number: 5,399,833
[45] Date of Patent: Mar. 21, 1995

[54] METHOD FOR VITRIFICATION OF FINE PARTICULATE MATTER AND PRODUCTS PRODUCED THEREBY

[76] Inventor: Salvador L. Camacho, 8913 O'Neal Rd., Raleigh, N.C. 27612

[21] Appl. No.: 86,005

[22] Filed: Jul. 2, 1993

[51] Int. Cl.⁶ .................. B23K 10/00; H05B 7/00
[52] U.S. Cl. .................. 219/121.59; 219/121.37; 219/121.38; 219/121.48; 110/250; 110/242; 588/227; 588/249; 588/900
[58] Field of Search .............. 219/121.59, 121.48, 219/121.36, 121.37, 121.38, 121.43; 110/250, 246, 252, 242; 588/210, 249, 212, 900, 227

[56] References Cited

U.S. PATENT DOCUMENTS

| 4,105,437 | 8/1978 | Liu | 75/10 R |
|---|---|---|---|
| 4,263,468 | 4/1981 | Primke et al. | 13/2 P |
| 4,310,350 | 1/1982 | Sarten | 75/10 R |
| 4,340,420 | 7/1982 | Santen et al. | 75/10 R |
| 4,627,990 | 12/1986 | Saga et al. | 427/10 |
| 4,725,288 | 2/1988 | Bougard | 48/76 |
| 4,740,989 | 4/1988 | Steipe et al. | 373/2 |
| 4,998,486 | 3/1991 | Dighe et al. | 110/346 |
| 5,104,432 | 4/1992 | Williams et al. | 65/2 |
| 5,107,517 | 4/1992 | Lauren | 373/18 |

*Primary Examiner*—Mark H. Paschall
*Attorney, Agent, or Firm*—Olive & Olive

[57] ABSTRACT

The present invention provides a method for the melting and subsequent solidification of fine particulate material by use of a plasma torch. The fine particulate material is introduced into a furnace having a plasma torch to a depth sufficient to cover the plasma flame produced by the torch. When operative, the torch generates a heat at low gas flow, which both allows the fine particulate material to rest with little disturbance and to transfer large amounts of heat energy to the fine particulate, effectively preheating the fine particulate material for more efficient melting. The melt may, for example, be solidified into a block for building use, into fibers by way of pressurized air passed through a venturi nozzle or into other useful forms.

29 Claims, 3 Drawing Sheets

METHOD FOR VITRIFICATION OF FINE PARTICULATE MATTER AND PRODUCTS PRODUCED THEREBY

BACKGROUND OF THE INVENTION

1. Field of the Invention

This invention relates to a method and apparatus for the vitrification of and reduction in volume of fine particulate materials, e.g., incinerator ash, and more particularly to vitrification and volume reduction of fine particulate materials in which the source of heat is a plasma arc torch and to products produced by such method.

2. Description of the Related Art

A large percentage, perhaps as much as fifty percent (50%), of the waste material generated throughout this country and the world is in the form of fine particulate. "Fine particulate" is intended to include by way of example such materials as sawdust, mineral powder, material shavings, dirt, dust and ash and generally refers to substantially non-metallic material with particle sizes up to 1 mm in its maximum dimension. A refractory, heat insulative ash product often comes from an incineration process performed to reduce the volume of larger volume waste items. By its nature, most fine particle material tends to have very low density and is subject to being disturbed by air flow or wind and, if disturbed, may be blown into the surrounding atmosphere. In addition, because there is so much volume of this fine waste, a large amount of space is required for disposal.

In certain instances, as for example in fine incinerator ash materials, a component of the fine particulate comprises oxides of some heavy metals. When unconfined, these heavy metal oxides, i.e., oxides of lead, iron, chromium, cadmium, arsenic, and mercury, tend to leach out of the ash or powder and contaminate the ground or water supply. Also to be noted is that such heavy metal components when subjected to high temperature, as in the method of the invention will vaporize.

In the prior art incineration furnaces, the typical refractory wall material will require replacement or repair after approximately three years of service.

There has been an increased public awareness of the need to reduce the volume of waste, both to save on the amount of space allocated to landfill operations and to avoid contamination of surrounding areas. Landfill sites are being filled up at a rapid rate, and it has become increasingly difficult to locate satisfactory new sites because of negative public sentiment.

The basic method and apparatus employed in practicing the invention disclosed below depends on a high-temperature low mass, high enthalpy heat source such as is taught in U.S. Pat. No. 3,779,182 to the present inventor for a REFUSE CONVERTING METHOD AND APPARATUS UTILIZING LONG ARC COLUMN FORMING PLASMA TORCHES, the teaching of which patent is incorporated herein by reference. Certain modifications and improvements to the apparatus of the '182 patent are disclosed below. The gas fed plasma torch used in the prior '182 patent and in the present invention has the useful properties of achieving very high temperatures and of requiring a relatively very small amount of gas in the heat-delivery process. According to the method disclosed below, both these properties are essential to the principles of the invention.

It is therefore an object of this invention to provide a process directed to the significant reduction of volume of fine particulate waste.

It is an additional object of the invention to process the resultant densified material into a useful form for recycling.

Other objects and advantages will be more fully apparent from the following disclosure and appended claims.

SUMMARY OF THE INVENTION

The present invention provides an apparatus with which to practice an energy efficient method of reducing the volume of fine particulate material by melting the material with a plasma torch. The fine particulate material is melted by the high enthalpy plasma arc heat and is cooled to form, in two alternate embodiments given by way of example, either a building block or an insulative fiber.

The apparatus utilized has a plasma arc torch positioned with its plasma flame end at or near the center of a cylindrical furnace. The term "flame" is used to mean the visible gas heated and created by the plasma column. The furnace is advantageously constructed of a relatively thin wall and relies on the heat insulative properties of the fine particulate material being processed to contain the heat. In a first embodiment, the plasma torch is operated in the transferred arc mode and is capable of pivoting in a plane; in the second embodiment, the plasma arc torch is operated in the non-transferred mode and is fixed.

The method of the invention includes submerging the plasma flame end of the plasma arc torch in the fine particulate material to be treated. The plasma flame creates a cavity within the fine particulates and generates a pool of molten particulate. The feed of fine particulate functions as a heat insulative barrier. Due to submerging the torch into the fine particulate material and the low volume of gas required by the plasma torch, the fine particulate material remains essentially undisturbed and the plasma gas escapes gradually through the fine particulate mass. A significant portion of the heat energy contained in the plasma gas is transferred to the particulate through which the plasma gas is flowing during its exit from the molten pool. The heat energy of the metal vapors accompanying the plasma gas is also transferred to the cold particulate feed, preventing the escape of leachable toxic metals.

DETAILED DESCRIPTION OF THE INVENTION AND PREFERRED EMBODIMENTS THEREOF

The plasma torch furnace apparatus of the first preferred embodiment as illustrated in FIGS. 1-5 is configured to perform the function of the invention according to a method which achieves beneficial and unanticipated results. In further reference to FIGS. 1 and 2, fine particulate 30 is added to the furnace 20 through inlet chute 22, the lower end of which is situated high enough to allow a sufficient height of material 30 to thoroughly cover the plasma flame 18 of a plasma torch 10. The plasma torch shield 10A isolates the plasma torch from the particulate feed. An auger may be used to move the material to chute 22. A baffle 12 is situated adjacent a wall of furnace 20 in a position so as to prevent newly added ash 30 from dropping directly out through exit channel 46. A vibrator V is mounted on the substantially thin sheet metal formed side wall of furnace housing 20 to ensure a smooth flow of fine particulate 30.

Figures 1, 5, 7:
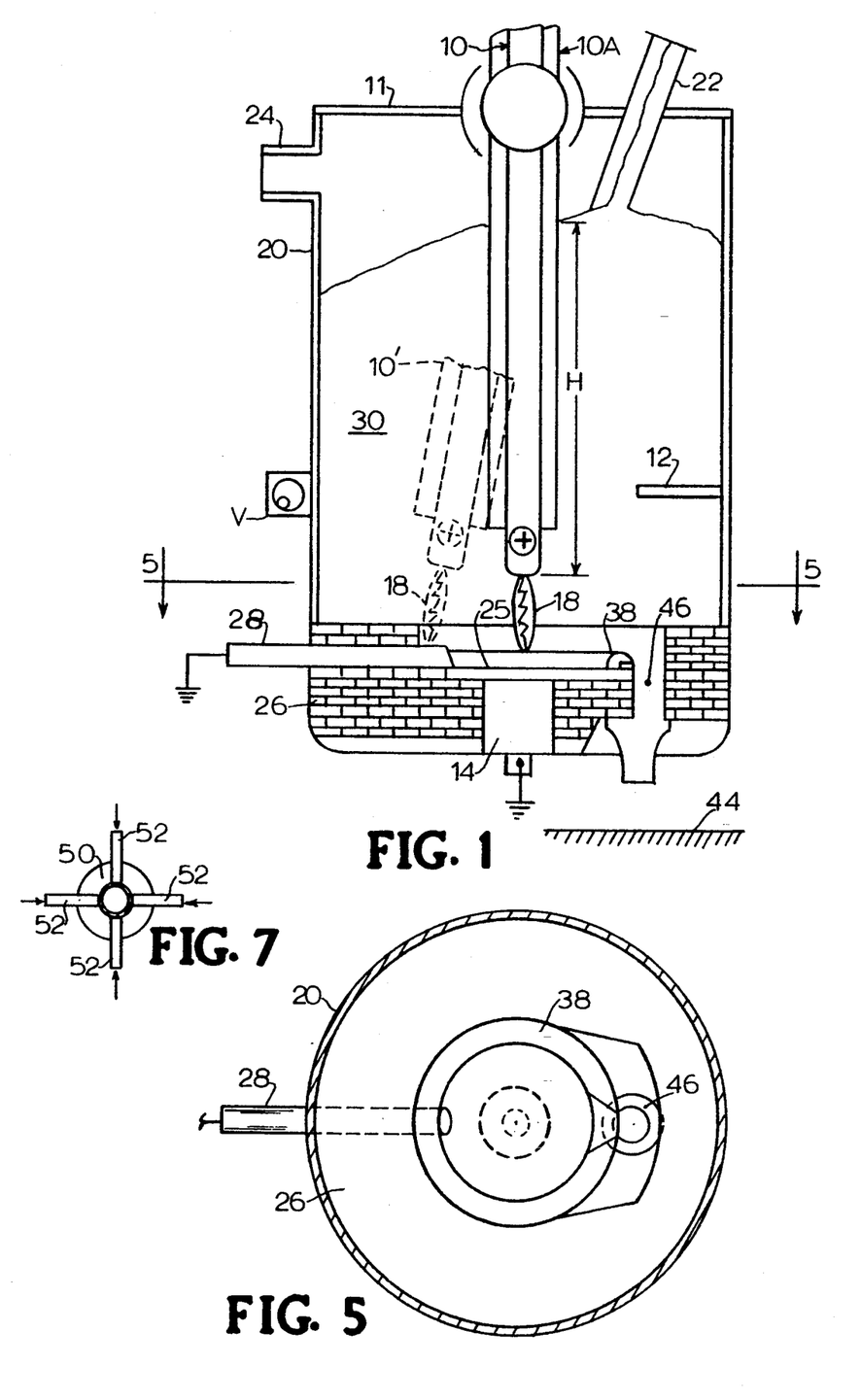
FIG. 1 is a schematic front elevation view of the apparatus, used in the invention method according to the first embodiment.
FIG. 5 is a plan view taken in the direction of line 5—5 of FIG. 1.
FIG. 7 is a plan view of the venturi nozzle taken along line 7—7 of FIG. 3.

An upper portion of the plasma torch 10 is mounted in a top wall 11 of the body of furnace 20 so as to be capable of pivotal movement in the plane of the drawing. In the vertical position, plasma torch 10 directs the plasma flame 18 at the middle of a depression 25 in furnace base 26, built of a thermally insulative refractory material, to melt material therein. At the beginning of the process, the fine particulate matter 30 is piled upon the furnace base, hearth 26 is this embodiment, to a height H substantially above the plasma flame 18 of torch 10 so as to submerge the plasma flame 18 in fine particulate 30. Torch 10 is initially pivoted into the position shown in dashed lines as 10′ where a first electrically grounded graphite terminal 28 operates to complete the electrical path required to generate the plasma arc 18. Plasma torch 10 is preferred to be operated in the transferred arc mode, wherein the positive electrical terminal (+) is connected to the body of the torch 10 and the negative electrical terminal, or ground, is connected initially, when torch 10 is pivoted, to first graphite rod 28 and when torch 10 is vertical to second graphite rod 14, which is installed within the hearth 26. Alternatively, plasma torch 10 may be operated in the non-transferred arc mode wherein both positive and negative terminals are established within the torch. Furnace 20 is preferred to be round in cross section (FIG. 5) to allow the heat energy from torch 10 to be evenly dispersed in all directions.

Figure 2:
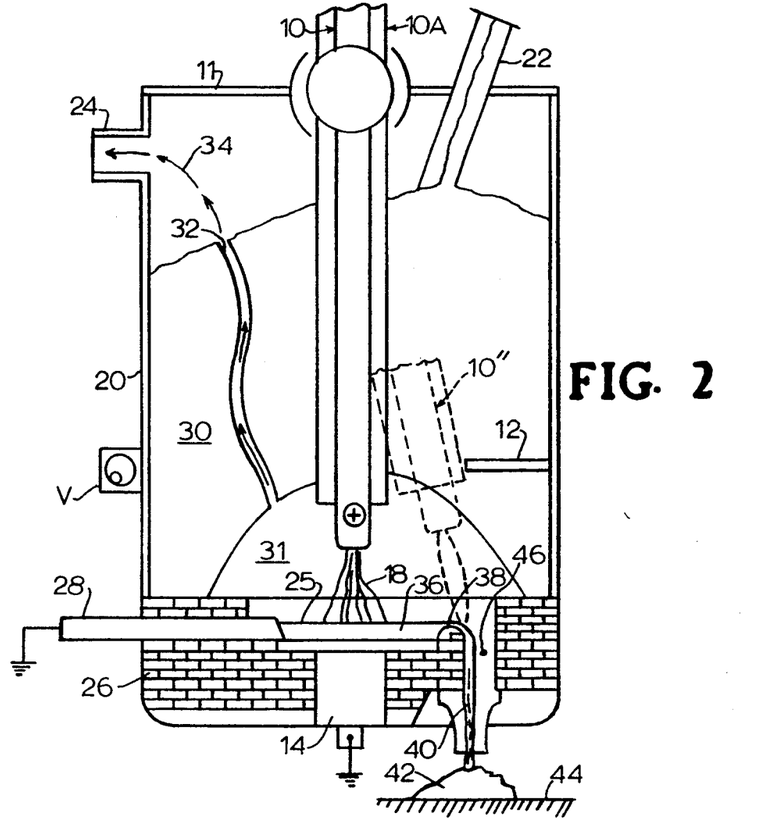
FIG. 2 is a schematic front elevation view of the apparatus of FIG. 1 with melted particulate product flowing to a cooling pile.

When a pool of liquid melt 36 has begun to form on hearth 26, the liquid is able to act as an electrical conductor in contact with second graphite rod 14. At this point in the process, torch 10 is returned to its vertical orientation with flame 18 impinging directly upon molten pool 36 as shown in FIG. 2. As the melting proceeds, the fine particulate 30 which is being melted falls into molten pool 36 and a dome shaped cavity 31 is created around plasma flame 18. For the process described in this first embodiment to function efficiently, it is preferred that the fine particulate 30 contains no more than about ten percent (10%) water.

As the torch 10 operates and melt 36 accumulates, a quantity of gaseous byproduct 34 (FIG. 2) is generated. The gas byproduct 34 consists primarily of the plasma gas flowing through torch 10 plus water vapor and a component of metal oxide vapors generated by the heat of the plasma flame 18, which is up to 4000° C. The byproduct gas 34 will gradually form a passage 32 (FIG. 2) through fine particulate 30 and a portion of byproduct gas 34 escapes from furnace 20 through stack connection 24. One effect of byproduct gas 34 passing through fine particulate 30 is a filtration of byproduct gas 34. While only one gas passage 32 is illustrated, in practice the formation of multiple passages 32 is typical. The formation of gas passage 32 is a function of the pressure of byproduct gas 34, the density of fine particulate 30 and the height H of fine particulate above the plasma flame 18. The byproduct gas 34 pressure, in turn, will depend on the composition of the material being processed and the temperature of the plasma flame. In a typical case, when processing incinerator ash of a density of approximately 700 g/1000 operating the torch at a plasma arc temperature of 4000° C., experiments indicate that the height H should be between about 1.0 and 1.5 times the furnace diameter. Less height H based on present experiments is indicated to not afford enough travel length to transfer heat to fine particulate 30 and condense the metal vapors as described below. Greater height, based on present experiments, would be expected to suppress escape of the byproduct gas.

Figure 4:
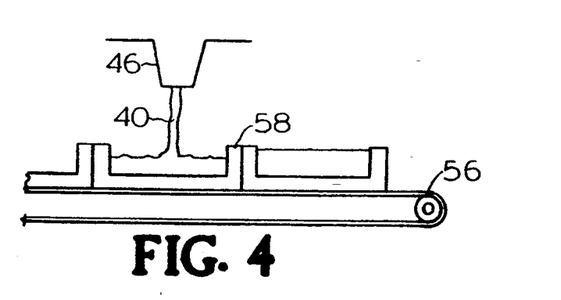
FIG. 4 is a partial schematic front elevation view of the exit channel of the apparatus with the melt flow collecting in a block form.

As the melt 36 continues to form, the tapping spout 38 portion of hearth 26 remains somewhat cooler than the melt 36 and causes the melt 36 to freeze and solidify rather than flow to exit stream 40. To re-melt the tapping spout 38 portion of melt 36 and allow the melt 36 to flow, torch 10 is redirected about its pivot into position 10″ (shown in dashed lines in FIG. 2) until a flow is established, and then torch 10 is returned to its vertical position. Melt 36 becomes stream 40 as it passes tapping spout 38 and then cools into residue 42 on surface 44 (FIG. 2). Variations on the character of surface 44, such as, e.g., a mold cavity 58 of FIG. 4, can be employed to produce, for example, uniform sized blocks to create a building block material of what was a waste material. The process depicted in FIG. 4 shows molten stream 40 flowing into block form 58 which is moved by conveyor 56 in the direction indicated by arrow A as each cavity is filled. A further variation comprises allowing stream 40 to drop into a pool of water (not shown) whereby the residue forms into pellets of between 1 cm and 4 cm in dimension which pellet material may be used as road bed or building aggregate. In its most basic form the solidified residue material is used as a filler for land reclamation.

It has been discovered that the method described above results in an unexpectedly high level of thermal efficiency indicated by the fact that while the temperature in the molten pool 36 and of the generated metal oxide vapors is approximately 2000° C., the temperature of the byproduct gas 34 going into stack connection 24 is only approximately 200° C. or less, when the fine particulate 30 is an ash product. The difference in heat energy between 2000° C. and 200° C. is transferred from byproduct gas 34 to fine particulate 30, which is being preheated so as to prevent heat loss and achieve quicker melting. Other particulate materials than ash would result in differing relative thermal absorption. In any case, the amount of heat energy needed to melt particulate 30 is reduced substantially by the heat absorbed by particulate 30 from the byproduct gas 34 passing therethrough.

When the temperature of the byproduct gas 34 is reduced, the gas component comprising metal oxide vapors condenses and precipitates back into the ash 30 and molten pool 36 to be subsequently melted again. This process, therefore, assures that these vapors will be perpetually re-condensed and will never escape to the atmosphere.

The heavy metal oxides are reduced by this vaporization and condensation process to return to the harmless metal condition. Ultimately, the heavy metals will be encapsulated in the melt 36 and immobilized when melt 36 cools to form vitrified residue 42.

In particular, the invention recognizes that fine particulate matter tends to be disturbed by air movement. Such air movement, if it were to occur, would cause fine particulate 30 to be blown around and the advantageous features of heat capture and metal vapor condensation would be lost. The fact that a plasma torch operates with a gas flow volume of only about five percent (5%) of that of a combustion flame allows the fine particulate 30 to remain relatively still during this melting process and thus be a highly effective heat sink.

It is to be noted that the side walls of furnace 20 as illustrated are constructed of a fairly thin metallic material rather than the conventional thick refractory as in the prior patent referred to above. This non-insulating wall construction is made possible because of the high thermal absorbency of the fine particulate, which, in turn, is related to the particle size and space between particles. While such a simple furnace construction is a desirable feature, the major economy created by the method of the invention is the conservation of heat energy as discussed above.

The present invention has further advantage by virtue of the insulative fine particulate eliminating the need for conventional refractory. In effect, the fine particulate acts as a continuously renewed thermal tolerant heat barrier, thus avoiding the need to repair or replace a refractory wall. In addition, when a prior art furnace operates on a material containing toxic components, the refractory will absorb a degree of toxicity. This effect compels extraordinary disposal handling techniques. Due to the benefits of the present invention, no such disposal is required.

Due to the encapsulation of potentially hazardous heavy metal oxides in the cooled, vitrified residue and the transformation of the bulk of the oxides to basic metallic form, the hazard is effectively eliminated or immobilized. The chart displayed below indicates the chemical analysis of a typical ash before processing and leachate obtainable from the solid residue after being melted and vitrified according to the method of the invention. It is to be noted that the major proportion of undesirable elements have been securely encapsulated or immobilized.

| Chemical | Ash (before) | Leachate (after) |
|---|---|---|
| Lead | 1.132 µg/g | <0.5 µg/g |
| Cadmium | 48.4 | <0.01 |
| Zinc | 24,475 | <0.002 |
| Arsenic | <5 | <0.01 |
| Chromium | 50 | <0.2 |
| Mercury | 230 | <0.001 |
| Chlorides | 6,121 | 1.6 |
| Fluorides | 288 | 0.3 |
| Sulfides | 58,948 | 187 |

Figure 3:
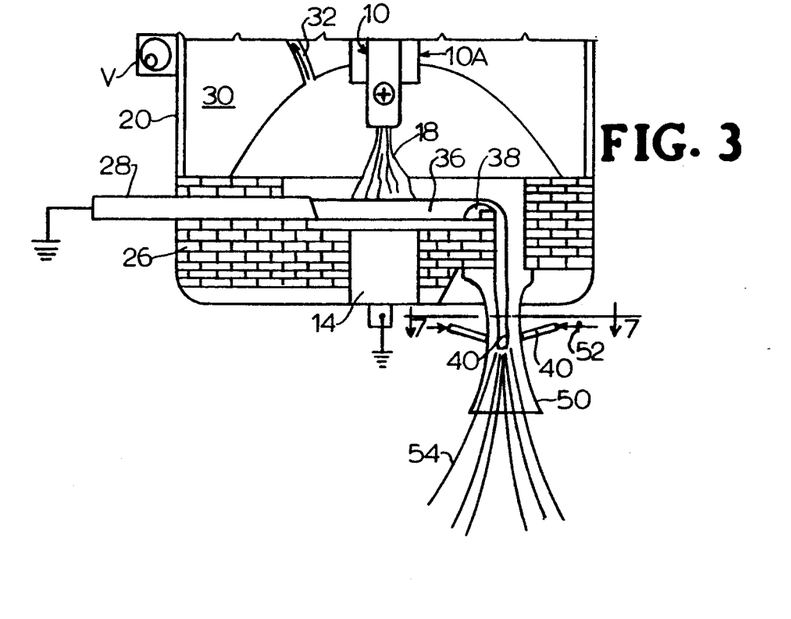
FIG. 3 is a partial schematic front elevation view of the apparatus of FIG. 1 wherein the melted product is passed through a venturi nozzle adapted for forming fibers.

A second embodiment of the invention is illustrated in FIG. 3 which shows a partial view of a similar furnace apparatus to that of FIGS. 1 and 2. Venturi nozzle 50 is added in the path of molten stream 40 emanating from furnace 20. A number of ports 46 angularly spaced around the sides of the neck portion of nozzle 50 introduce a flow of compressed air 52 at a slight angle (i.e. 5°–10°) directed downstream with respect to the flow of molten stream 40. Due to the action of the venturi nozzle 50 and the air flow 52, the velocity of the stream 40 of molten matter increases and mixes with the pressurized air 52 to cause the melt stream 40 to form into long thin fibers 54 which are dispensed from the end of nozzle 50.

Such fibers 54, especially as formed of an ash particulate, have high thermal tolerance and are useful as an insulating material. Although the fibers formed in a process such as that described are not typically uniform in length or cross section, they are adequate as a thermal insulator. Much of the heavy metal which is melted with the fine particulate 30 in the process of the invention tends to remain out of fibers 54 and is easily separated from the ash fiber by means of gravity as the fibers 54 are blown to a collecting site.

A further variation in the form of possible output of the method of the invention is shown in FIG. 4. A high temperature tolerant form 58 is placed below exit chute 46 so as to receive stream 40. Form 58 is moved by conveyor 56 or other convenient means when the required quantity of melt stream 40 has been deposited. Cooling is accomplished at another location, followed by removing the resultant block from form 58. Form 58 may be of a selected shape so as to produce various block styles. The vitrified residue forming the resultant blocks is approximately four times the density of the ash from which it is formed.

Figure 6:
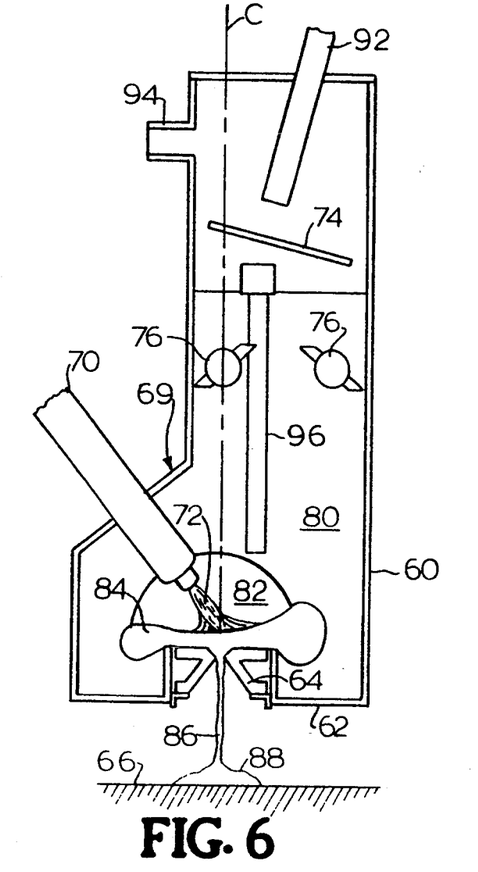
FIG. 6 is a schematic front elevation view of a second embodiment of the apparatus of the invention with melted particulate flowing to a cooling pile.

FIG. 6 illustrates a modified design for furnace 60 which is especially suited to processing water-saturated ash or sludge 80. According to this embodiment, sludge 80 is continuously fed into furnace 60 by inlet chute 92 and is uniformly distributed by spreader 74 and paddles 76. Plasma arc torch 70 is here fixedly mounted in an angled side wall 69 and is positioned at an angle to the center line C of furnace 60 and extends into the furnace sufficiently such that the plasma arc flame 72 is submerged below the ash or sludge 80 at the approximate centerline C of the lower chamber of furnace 60. The torch employed is operated in the non-transferred mode, thereby needing no external electrodes.

A water-saturated ash 80 is relatively heavy and will pack more densely than dry ash when formed in a column of selected height. The effect of the increased density on the process of the invention is that the gases supplied by torch 70 and formed by vaporization are not able to penetrate ash 80 to both escape and transfer heat. This gas entrapment is most severe early in the process when gas pressure is low, and less severe when the temperature and gas pressure are both greater. Gas bypass tube 96 is provided to receive gas near flame 72 and deliver gas above ash/sludge 80. When the process has operated long enough that a sufficient gas pressure and temperature is available to penetrate sludge 80, a gas valve (not shown) is closed in bypass tube 96 to force the escaping gas through sludge 80 as descried above. In addition to the previously described effect of transferring heat to ash/sludge 80 and simultaneously condensing metal vapors, the hot gas also causes a major portion of the water component of sludge 80 to evaporate so as to result in a dry ash for more effective treatment. The gas ultimately exits through gas stack 94.

As sludge 80 is melted into molten pool 84, cavity 82 is formed on top of tapping nozzle 64. It is to be noted that furnace 60 has no refractory hearth, but utilizes sludge/ash 80 as a insulator around and beneath molten pool 84. The output molten stream 86 emanates from a center orifice of tapping spout 64, thus stream 86 remains hot and able to flow and accumulates as melt 88 on floor 66.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A method for the vitrification of fine particulate material characterized as heat insulative and refractory in nature, comprising:
   (a) introducing a quantity of fine particulate material characterized as heat insulative and refractory in nature without additives into a furnace having an internal base and a plasma torch positioned above the base and capable of providing at its discharge end a high temperature plasma flame as a low mass, high enthalpy heat source;
   (b) piling said fine particulate material on said base to a height so as to cover and enable the plasma flame of said plasma torch to be totally submerged in said fine particulate material;
   (c) energizing said plasma torch and feeding said plasma torch with a plasma gas so as to generate and discharge from said plasma torch a high temperature plasma flame;
   (d) heating and melting said fine particulate material with said submerged plasma flame to create downwardly flowing melted material and upwardly flowing plasma gas and vaporized components of said material;
   (e) forming a cavity in said fine particulate material surrounding said plasma flame by means of the heat of said plasma flame;
   (f) allowing the upwardly flowing plasma gas and vaporized components generated by the heating and melting step to pass through said fine particulate material and escape from said cavity and, in so doing, to transfer a portion of the heat energy in said gas and vaporized components to said fine particulate material and to simultaneously cause the temperature of said gas to be reduced and portions of said vaporized components to condense and be trapped in the said fine particulate material; and
   (g) directing the melted fine particulate material generated by said melting step to flow out of said furnace.

2. The method for the vitrification of fine particulate material as claimed in claim 1 wherein said furnace includes an electrical ground terminal proximate said internal base to which said plasma discharge may attach and further comprising the step of temporarily pivoting said plasma torch toward said electrical ground terminal of said furnace so as to attach said plasma discharge thereto and thereby operate said plasma torch in a transferred arc mode.

3. The method for the vitrification of a fine particulate material as claimed in claim 1 including the step of operating said plasma torch in a non-transferred arc mode.

4. The method for the vitrification of fine particulate material as claimed in claim 1 wherein said fine particulate material comprises substantially dry ash and said method comprises vitrifying said ash.

5. The method for the vitrification of fine particulate material as claimed in claim 4 including the step of operating said plasma torch in a non-transferred arc mode during vitrifying of said ash.

6. The method for the vitrification of fine particulate material as claimed in claim 4 including the step of operating said plasma torch in a transferred arc mode.

7. The method for the vitrification of fine particulate material as claimed in claim 1 wherein said furnace comprises a substantially thin wall housing and including the step of utilizing the heat insulative properties of said fine particulate material to contain the heat within said furnace.

8. The method as claimed in claim 1 wherein said furnace includes a wall and said fine particulate material within said furnace is vitrified in a manner whereby it serves to establish and continuously renew an insulative barrier to the wall thereof.

9. The method for the vitrification of fine particulate material as claimed in claim 7 including the step of vibrating said thin wall housing to facilitate flow of said fine particulate material within said furnace.

10. The method as claimed in claim 1 wherein said furnace has a housing which is round in shape as viewed in plan and including the step of dispersing the heat energy from said plasma arc torch evenly in all directions toward said housing.

11. The method for the vitrification of fine particulate material as claimed in claim 1 including the step of piling said material in said furnace to a height equal to between 1 and 1.5 times said furnace diameter.

12. The method for the vitrification of fine particulate material as claimed in claim 1 including the step of maintaining the particles comprising said fine particulate material relatively still during said step of heating and melting.

13. The method for the vitrification of fine particulate material as claimed in claim 1 wherein said fine particulate material comprises substantially water-saturated ash.

14. The method for the vitrification of fine particulate material as claimed in claim 2 wherein said internal base comprises a hearth and including the step of piling said material on said hearth.

15. The method for the vitrification of fine particulate material as claimed in claim 14 wherein said furnace includes a tapping spout proximate said hearth and further comprising the step of temporarily directing said plasma torch toward said tapping spout of said furnace so as to enhance the flow of said melted material from said tapping spout.

16. The method for the vitrification of fine particulate material as claimed in claim 15, further comprising the step of directing said melted material flowing from said tapping spout into a form and allowing said melted material to cool and solidify in said form.

17. The method for the vitrification of fine particulate material as claimed in claim 16 including the step of allowing said melted material to cool and solidify so as to form a block.

18. The method for the vitrification of fine particulate material as claimed in claim 1 wherein said furnace further comprises a venturi portion positioned so as to pass said melted fine particulate material out of said furnace and further including the step of introducing a stream of pressurized air at a selected angle to the flow of said melted material flowing out of said furnace venturi portion so as to form a fiber.

19. The method for the vitrification of fine particulate material as claimed in claim 18 including the step of separating any heavy metal residue contained in said melted material flowing out of said furnace from said fiber.

20. The method for the vitrification of fine particulate material as claimed in claim 1 wherein said fine particulate material includes heavy metal components and including the steps of:
   (a) converting said fine particulate material including said metal components to a melt and a gaseous byproduct;
   (b) allowing said gaseous byproduct to rise through said fine particulate material such that said fine particulate material is heated and said gaseous byproduct is simultaneously cooled, thereby causing gases contained in said gaseous byproduct to condense and precipitate into the melted material; and
   (c) passing said melted material flowing out of said furnace through a venturi nozzle into which a flow of compressed air is introduced to cause said melted material to solidify in the form of fibers.

21. The method for the vitrification of fine particulate material as claimed in claim 20 including the step of continuing to practice said method to the extent that the heavy metals contained in said heavy metal components are encapsulated in said melted material flowing out of said furnace.

22. The method for the vitrification of fine particulate material as claimed in claim 21 wherein the fine particulate material is ash and said method comprises vitrifying said ash.

23. The method for the vitrification of fine particulate material as claimed in claim 1 including the steps comprising:
   (a) directing the melted material flowing out of said furnace through a venturi nozzle having a neck portion; and
   (b) introducing a flow of pressurized air to said neck portion so as to mix with said melted material and thereby form heat insulative fibers.

24. The method for the vitrification of fine particulate material as claimed in claim 1 including the steps comprising: (a) collecting said melted material flowing out of said furnace in a first block form in a collecting position; and
   (b) when said first block form has sufficient quantity of said melted material, moving said first block form to a remote position and moving a second block form into said collecting position.

25. The method for the vitrification of fine particulate material as claimed in claim 1 including the step of pelletizing said melted material flowing from said furnace.

26. The method of vitrification for fine particulate material as claimed in 1 wherein said furnace includes an electrical ground terminal proximate said internal base to which said plasma torch may attach and further including the step of operating said ground terminal.

27. The method vitrification for fine particulate material as claimed in claim 1 wherein said plasma torch is pivotable and normally vertical and including the step of pivoting said plasma torch when required to redirect said plasma flame toward portions of said melted material offset from the normal position of said plasma torch.

28. A block created of vitrified fine particulate material characterized as heat insulative and refractory in nature by a method comprising the steps of:
   (a) introducing a quantity of fine particulate material characterized as heat insulative and refractory in nature without additives into a furnace having an internal base and a plasma torch positioned above the base and capable of providing at its discharge end a high temperature plasma flame as a low mass, high enthalpy heat source;
   (b) piling said fine particulate material on said base to a height so as to cover and enable the discharge end of said plasma torch to be totally submerged in said fine particular material;.
   (c) energizing said plasma torch and feeding said plasma torch with a plasma gas so as to generate and discharge from said plasma torch a high temperature plasma flame; (d) heating and melting said fine particulate material with said submerged plasma flame to create downwardly flowing melted material and upwardly flowing plasma gas and vaporized components of said material;
   (e) forming a cavity in said fine particulate material surrounding said plasma flame by melting a portion of said fine particulate material with said plasma flame;
   (f) allowing the upwardly flowing plasma gas and vaporized components generated by the heating and melting step to pass through said fine particulate material and escape from said cavity and, in so doing, to transfer a portion of the heat energy in said gas and vaporized components to said fine particulate material and to simultaneously cause the temperature of said gas to be reduced and portions of said vaporized components to condense in the said fine particulate refractory material;
   (g) directing the melted fine particulate material generated by said melting step to flow out of said furnace into a form; and (h) allowing said melted fine particulate material in said form to cool and solidify into a block corresponding to the shape of said form.

29. A fiber created by the vitrification of fine particulate material characterized as heat insulative and refractory in nature, comprising the steps of:
   (a) introducing a quantity of fine particulate material characterized as heat insulative and refractory in nature without additives into a furnace having an internal base and a plasma torch positioned above the base and capable of providing at its discharge end a high temperature plasma flame as a low mass, high enthalpy heat source;
   (b) piling said fine particulate material on said base to a height so as to cover and enable the discharge end of said plasma torch to be totally submerged in said fine particulate refractory material;
   (c) energizing said plasma torch and feeding said plasma torch with a plasma gas so as to generate and discharge from said plasma torch a high temperature plasma flame;
   (d) heating and melting said fine particulate material with said submerged plasma flame to create downwardly flowing melted material and upwardly flowing plasma gas and vaporized components of said material;

(e) forming a cavity in said fine particulate material surrounding said plasma flame by melting a portion of said fine particulate refractory material with said plasma flame;

(f) allowing the upwardly flowing plasma gas and vaporized components generated by the heating and melting step to pass through said fine particulate material and escape from said cavity and, in so doing, to transfer a portion of the heat energy in said gas and vaporized components to said fine particulate material and to simultaneously cause the temperature of said gas to be reduced and portions of said vaporized components to condense in the said fine particulate material; and (g) directing the melted fine particulate material generated by said melting step to flow out of said furnace and introducing a stream of pressurized air to said melted material flow so as to form said melt into a fiber.

* * * * *

UNITED STATES PATENT AND TRADEMARK OFFICE
CERTIFICATE OF CORRECTION

PATENT NO. : 5,399,833
DATED : March 21, 1995
INVENTOR(S) : Salvador L. Camacho

It is certified that error appears in the above-indentified patent and that said Letters Patent is hereby corrected as shown below:

Column 3, line 33, correct "is" to read --in--.

Column 4, line 17, after "1000" insert --cc and--.

Column 9, line 65, after "said" add --plasma torch in a transferred arc mode with said plasma discharge attached to said--.

Column 9, line 66, after "method" add --of--.

Signed and Sealed this

Fourth Day of July, 1995

Attest:

BRUCE LEHMAN

Attesting Officer

Commissioner of Patents and Trademarks